Nov. 26, 1935.  E. SCHNEIDER  2,021,899
TREATMENT OF CHEESE
Filed Nov. 29, 1932  2 Sheets-Sheet 1
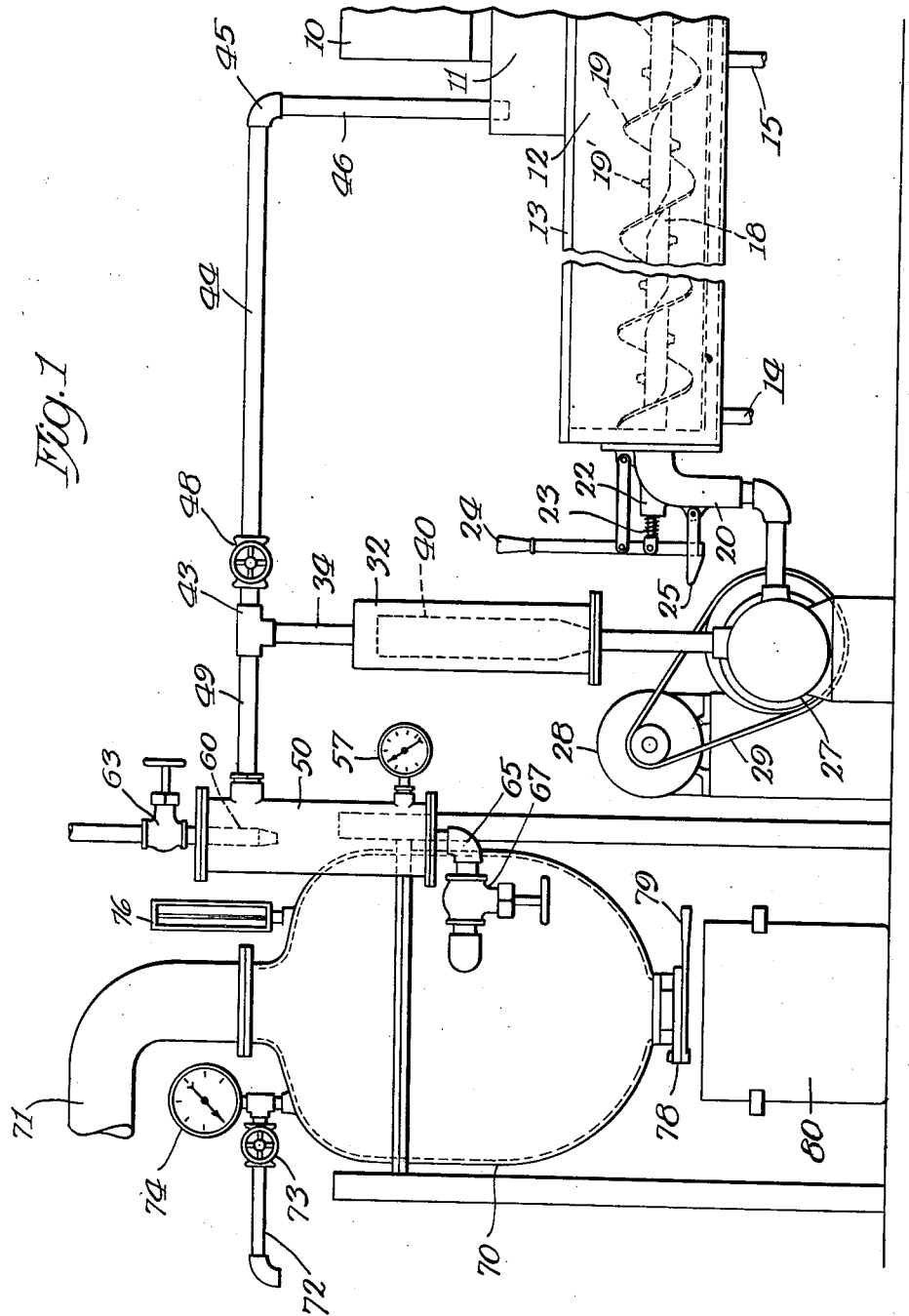
Inventor
Ernest Schneider
By Fisher, Clapp, Soans & Pond, Attys.

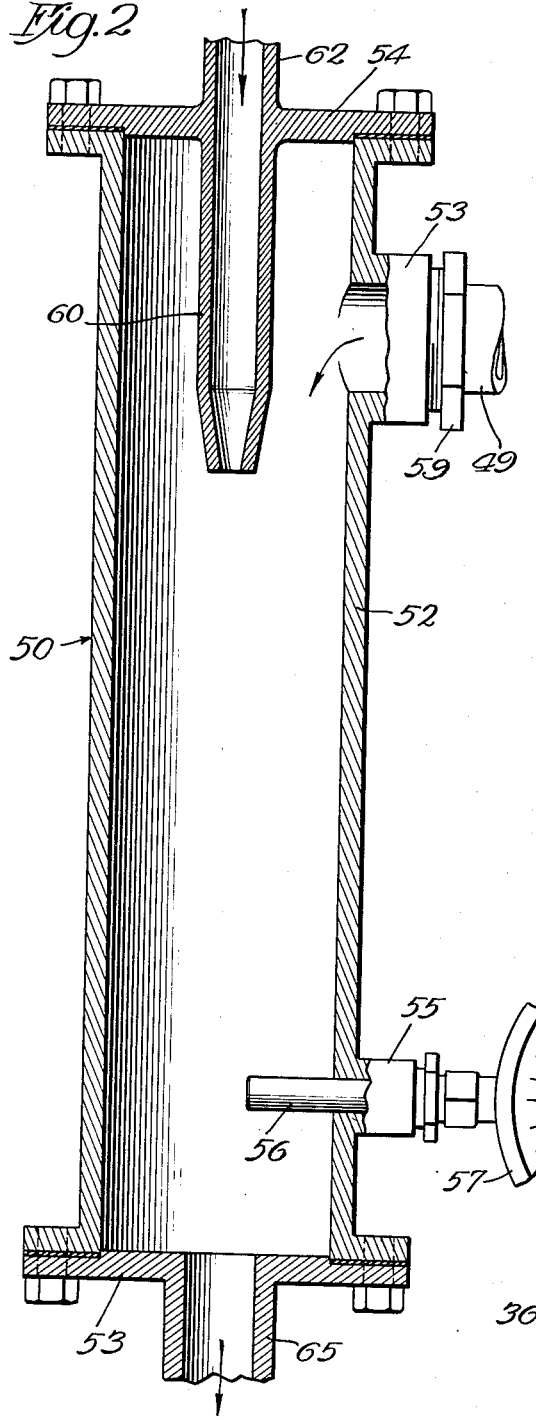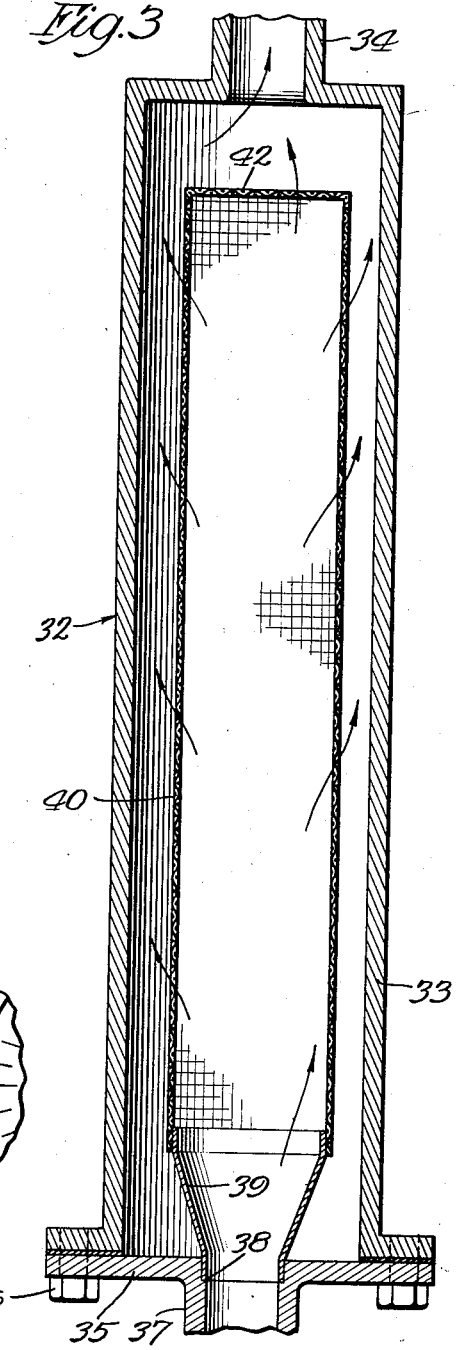

Patented Nov. 26, 1935

2,021,899

UNITED STATES PATENT OFFICE 2,021,899

TREATMENT OF CHEESE

Ernest Schneider, Chicago, Ill., assignor to Kraft-Phenix Cheese Corporation, Chicago, Ill., a corporation of Delaware Application November 29, 1932, Serial No. 644,805

13 Claims. (Cl. 99—11)

My invention relates broadly to the treatment of cheeses for the improvement thereof as an article of diet, and has to do more particularly with a process and apparatus for the treatment of soft cheeses, which in general normally contain 40% or more of moisture, such as Limburger, Camembert, and the like, with the object of improving the flavor, texture, and keeping-qualities thereof.

An object of my invention, therefore, is to provide a new and improved process of the class referred to, which will be simple, economical and efficient.

A further object is to provide improved apparatus which will be highly satisfactory for the purpose of carrying out my process.

Various other objects and advantages will become apparent as the description proceeds.

Referring to the drawings forming part of this specification and disclosing a preferred embodiment of my improved apparatus:—

Fig. 1 is a diagrammatic elevational view of the principal elements of the mechanical setup.

Fig. 2 is a sectional view of the steaming device, and

Fig. 3 is a sectional view of the strainer forming a part of my invention.

The numeral 10 represents a hopper or feeding device from which the cheese and admixed ingredients to be treated are conducted to a loading chamber 11, this chamber being provided with suitable means (not shown) for permitting the withdrawal of samples. The loading chamber 11 communicates with a cylindrical mixing receptacle 12, this receptacle being surrounded by a jacket 13, into which steam or hot water is introduced through a pipe 14 and from which condensate or cooled water is withdrawn via a pipe 5. Journaled within the receptacle 12 is a hollow shaft 18 carrying a helical screw blade 19. Suitable provision (not shown) is made for the introduction of steam into the hollow shaft 18 which is provided with nozzles 19' whereby steam is jetted into the material which is being worked in the receptacle 12.

The receptacle 12 is provided with an outlet opening communicating with a tubular member 20, which may be angular or elbow-shaped, as shown in Figure 1, and is provided with a valve 22. This valve is normally retained in a closed position by a spring 23 and may be opened by means of a manually operable lever 24, retainable by means of a suitable latch 25.

The outlet member 20 communicates by means of suitable fittings with a pump 27, which is operated by means of an electric motor 28 or other suitable motivating means acting through a belt 29 or other suitable drive. The pump 27 is preferably of the centrifugal type, and communicates at its outlet, through suitable fittings, with a straining device 32.

This strainer, which is shown in detail in Figure 3, comprises a cylindrical casing 33, which may be restricted at its outlet end as shown at 34, and is closed at its inlet end by means of a closure plate 35 secured by bolts 36 or other suitable means. Preferably integral with the closure plate 35 is a tubular member 37, the terminal portion of which is preferably channeled to form an annular shoulder 38 for the seating of a substantially frusto-conical tubular member 39. Secured to the larger extremity of the member 39 is a tubular foraminous member 40, formed of wire screening or other suitable material, the outlet end of which is closed by means of a circular piece of material 42 which may be similar to the foraminous material forming the cylindrical member 40.

The tubular member 34 which serves as an outlet for the straining device 32 is connected to a T-fitting 43, which is connected at one side with a pipe section 44, elbow 45, and pipe section 46, which collectively serve as a return conduit to the loading chamber 11. Arranged in the pipe section 44 adjacent the T 43 is a suitable valve 48, such as a pressure valve or the like. On the other side of the T-fitting 43 this member communicates, through a pipe section 49, with a heater or steaming device 50. Referring to Figure 2 in which the heater 50 is shown in detail, it will be seen that this device consists of a cylindrical section 52 having annular flanges at its ends to which are secured closure plates 53 and 54. The cylindrical member 52 is provided with a nipple 53', threaded to receive a coupling member 59 for the pipe section 49, and another nipple 55 which seats a thermometer 56 for registering the temperature within the device 50 on a suitable gauge 57.

Preferably integral with the closure plate 54 is an elongated nozzle 60 whereby steam introduced into this member from a suitable source will be injected into material disposed within the device 50. Steam is introduced into the tubular member 60 by means of a conduit 62 which may also be integral with the plate 54 and may be controlled by means of a suitable hand valve 63, such as a globe valve or the like. If desired, this valve may be of an automatic type, to be controlled by the amount of material passing through the heating chamber to vary the amount of steam injected.

Preferably integral with the plate 53 is an outlet conduit 65 which communicates, by means of suitable fittings, including a hand valve 67, with a vacuum pan 70. This vacuum pan may be of any approved type, a tubular member 71 at the upper portion thereof communicating with a vacuum pump and a conduit 72 leading to the atmosphere, this conduit being provided with a hand valve 73 and a vacuum gauge 74. A thermometer 76 indicates the temperature within the vacuum pan. This vacuum pan discharges by means of a closure plate 78 controlled by a hand lever 79 into a suitable receptacle such as indicated at 80.

The operation of the apparatus just described, in accordance with my improved process, is as follows: The cheeses to be treated, which may be Limburger, Camembert, or other cheeses of the soft type, are preferably ground, broken up, or otherwise comminuted, and preferably mixed with a suitable emulsifying agent. These cheeses, while of the same type, may and usually do vary considerably in flavor, age, and texture. The emulsifying agent may be a salt, preferably anhydrous sodium phosphate, in the proportion of from one to three per cent, by weight, of the cheese, and is preferably introduced in the dry form, or it may be whole-milk powder, which is very high in phosphate. The cheese with the emulsifying agent is fed to the hopper 10, from which it is conveyed to the loading chamber 11, and thence to the mixer 12.

At the outset of a run, the valve 22 is retained in closed position and the material is agitated within the chamber 12 with the direct introduction of steam into the material from the nozzles 19', it being understood, of course, that steam or hot water is also maintained in the jacket 13. The valve 22 is kept closed until the cheese is melted and thoroughly mixed with the emulsifier in the chamber 12, which preferably should not take substantially more than about two minutes, in order to avoid cooking the material. The valve 22 is then opened and at the same time the steam is cut off from the shaft 18, so that there is no longer any direct introduction of steam into the material at this point. The mixture is then drawn by the pump through the outlet member 20, pump 27, and strainer 32, and is circulated back through the fittings 44, 45, and 46 to the loading chamber 11, the valve 67, of course, being closed. The centrifugal pump tends to produce an homogenizing effect on the material and, of course, it will be obvious that the strainer 32 will act to separate from the material any lumps and will thus assist in producing a product of fine and smooth texture.

While the material is being circulated as just described, samples thereof are taken at frequent intervals at the loading chamber, these samples being tested for their pH value. This value will vary from about 4.5 to 7.2, depending on the type of cheese being worked and flavor desired. The optimum pH value desired for Limburger is about 6.8. The pH is adjusted by adding to the material in the hopper 10 either sodium bicarbonate, in the event that the material is too acid, which is usually the case, or phosphoric acid or disodium phosphate, in the event that it is not acid enough.

It is very important that the working of the material within the mixer 12 and the circulation thereof through the pump and strainer and back to the mixer be not protracted, for I have found that by restricting the period of circulation to a maximum of six or seven minutes the material can be reduced to the desired smooth consistency without any substantial loss in flavor. This is an important advantage in my process over the prior art processes known to me, wherein cheese is cooked and worked for periods of half an hour or longer.

During the circulation of the material as above described, I prefer to maintain it at a certain elevated temperature, usually between about 120° to 200° F., this temperature being fixed according to the amount of body desired in the finished product. If a heavier or more solid consistency is desired, a lower temperature is used. This temperature can be controlled by the heating fluid in the jacket 13.

By using anhydrous sodium phosphate in the solid form, I find that a greatly improved effect is obtained over the use of hydrated sodium phosphate. I can best describe this by saying that the anhydrous salt acts almost immediately to solubilize the casein in the cheese so as partially to liquefy it and thus to produce an extremely smooth product of unimpaired flavor in a minimum of time. The use of hydrated sodium phosphate or dilute solutions of emulsifier requires long periods of cooking and mixing in order to produce similar effects upon the texture of the cheese, and the inevitable result is a very deleterious effect on the flavor of the product.

The principal function of the circulation is thoroughly to blend the cheeses and mix the same with the emulsifier, so as to effect a perfectly uniform flavor and texture, while also homogenizing.

The circulation of the material as above described is continued until the material is of a thin creamy consistency, this operation requiring, as stated above, not more than about six or seven minutes. After the completion of this operation, the valve 67, which has been closed up to this point, is opened, as a result of which the material is pumped into the vacuum can 70. The pressure valve 48 is so set that it will close automatically when the valve 67 is opened. At the same time, the steam valve 63 is opened so that steam is injected into the material in the mixer 50 as it is being pumped therethrough into the vacuum pan, and a vacuum drawn within the vacuum pan.

The injection of steam is continued until the thermometer 57 reads between about 212° and 245° F. This temperature is controlled by means of valves 63 and 67. When the predetermined temperature is reached, all the cheese being in the pan, the vacuum is continued until the material has attained the desired body or consistency. This requires from about three to five minutes; the vacuum may be around eighteen inches. The vacuum is then cut and the contents of the pan drawn into the receptacle 80 or the like. The material is preferably immediately packed while hot.

Material prepared in accordance with my invention as described above is found to be vastly superior to similar products in regard to smoothness, palatability, and especially with regard to flavor. This is believed to be due, to a large extent, to the brief period of treatment, whereby the delicate aroma-bearing ingredients are preserved and the production of cooked flavors is avoided. This brief treatment is also, to a considerable extent, made possible by the use of a concentrated reagent as an emulsifying agent, which acts promptly and effectively upon the casein to form a product of superior smoothness.

A treatment in the vacuum pan affects the consistency of the product by imparting a maximum swell to the casein, so as to render the product extremely smooth and velvety to the tongue. As a result of this treatment the material as it is drawn from the vacuum pan is considerably thicker than when it leaves the mixer 12.

The great advantage of my product is that, if properly packed and thus protected from contamination, its superior flavor will remain substantially fixed, inasmuch as pasteurization is an incident to the process described above. This is a great advantage over the ordinary cheese of the types above referred to, which deteriorate very rapidly due to the fact that the bacterial action is not arrested.

Various changes, variations and modifications coming within the spirit of my invention will doubtless suggest themselves to those skilled in the art. Hence, I do not wish to be restricted to the specific embodiments shown herein or uses mentioned, except to the extent indicated in the appended claims, which are to be interpreted as broadly as the state of the art will permit.

I claim as my invention:

1. A method of treating a cheese comprising adding to said cheese an emulsifier, mechanically treating the material at an elevated temperature but not substantially above 200° F., so as to give it a smooth consistency, and briefly subjecting the material to heat and then to vacuum without the addition of heat to swell the casein, all of said operations being so conducted and so timed as to accomplish the desired result with substantially no impairment of the flavor of the product.

2. A method as defined in claim 1, wherein the emulsifier is introduced into the material in substantially anhydrous condition.

3. A method as defined in claim 1, wherein the emulsifier is inhydrous sodium phosphate.

4. A process as defined in claim, wherein the total time of treatment is not more than about fifteen minutes.

5. A process as defined in claim 1, wherein the total time of treatment is not more than about fifteen minutes, wherein the material is strained a plurality of times, and wherein the emulsifier is anhydrous sodium phosphate.

6. A method of treating a soft cheese comprising adding to said cheese an anhydrous emulsifier, mechanically treating the mixture at an elevated temperature but not substantially above 200° F. to mix and homogenize it and to render it of a smooth consistency, and subsequently subjecting the material to a vacuum without the addition of heat in the vacuum pan in order to swell the casein, all of said operations being conducted within a closed system and occupying a period of time so brief that the flavor of the product will not be substantially impaired.

7. A method as defined in claim 6, wherein the emulsifier is anhydrous sodium phosphate, wherein the material is strained a plurality of times and wherein the total period of treatment is not more than about fifteen minutes.

8. A method of treating cheese comprising adding to said cheese an anhydrous emulsifying agent, working the material at an elevated temperature for a brief period of time so as to mix the ingredients, straining and homogenizing the material while maintaining it at an elevated temperature but not substantially above 200° F., until it has attained a thin creamy consistency, said treatment being accomplished without the addition of liquid and in a closed system, and then subjecting said material to a vacuum without the addition of heat in the vacuum pan so as to swell the casein, the time of said operations being so short as to avoid imparting a cooked flavor to the product and substantially to preserve the aroma-bearing ingredients.

9. A method of treating cheese to enhance the smoothness and flavor and to swell the casein thereof, comprising briefly subjecting the cheese to a temperature of at least 212° F., the period of heating being sufficiently short that the cheese will not be cooked and will not be given a deleterious flavor or odor, and then promptly subjecting the cheese to a reduced pressure without further addition of heat so as quickly to reduce the temperature thereof and to swell the casein.

10. A method of treating cheese comprising mechanically treating the cheese at an elevated temperature but not substantially above 245° F. so as to render it of a smooth consistency and then promptly subjecting the material to a vacuum without addition of heat in the vacuum pan so as to swell the casein, all of said operations being conducted within a closed system and occupying a period of time so brief that the flavor of the product will not be substantially impaired.

11. A method of treating a soft cheese, comprising adding to said cheese an emulsifier, converting said cheese to a smooth liquid condition by mechanical means and heat and without the addition of liquid, quickly raising the temperature of the liquefied cheese to a temperature between approximately 212 and 245° F., and then promptly subjecting the material to a brief vacuum without further heating, in order to swell the casein and reduce the temperature thereof.

12. A method of treating cheese to enhance the smoothness and flavor and to swell the casein thereof, comprising briefly heating the cheese, the period of heating being sufficiently short so that the cheese will not be given a deleterious flavor or odor, and then promptly subjecting the cheese to a reduced pressure without further addition of heat so as quickly to reduce the temperature thereof and to swell the casein, the heating temperature being sufficiently above that required to fuse the cheese that said reduction of pressure will not cause the cheese to solidify before it is packed.

13. A method of treating a soft cheese such as Limburger and the like to enhance the smoothness and flavor and to swell the casein thereof, comprising briefly heating the cheese, the period of heating being sufficiently short so that the cheese will not be given a deleterious flavor or odor, and then promptly subjecting the cheese to a reduced pressure without further addition of heat so as quickly to reduce the temperature thereof and to swell the casein, the heating temperature being sufficiently above that required to fuse the cheese that said reduction of pressure will not cause the cheese to solidify before it is packed.

ERNEST SCHNEIDER.

CERTIFICATE OF CORRECTION.

Patent No. 2,021,899.                                                                                November 26, 1935.

ERNEST SCHNEIDER.

It is hereby certified that error appears in the printed specification of the above numbered patent requiring correction as follows: Page 1, first column, line 39, for the numeral "5" read 15; page 3, first column, line 44, claim 3, for "inhydrous" read anhydrous; line 45, claim 4, after the word "claim" and before the comma insert the numeral 1; and that the said Letters Patent should be read with these corrections therein that the same may conform to the record of the case in the Patent Office.

Signed and sealed this 14th day of January, A. D. 1936.

(Seal)                                                    Leslie Frazer
                                                        Acting Commissioner of Patents.